United States Patent
Nishikawa

Patent Number: 5,946,412
Date of Patent: *Aug. 31, 1999

[54] IMAGE PROCESSING SYSTEM WHICH GENERATES PREVIEW IMAGE DATA IN ACCORDANCE WITH THE TYPE OF IMAGE TO BE PREVIEWED

[75] Inventor: Naoyuki Nishikawa, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/959,721

[22] Filed: Oct. 28, 1997

Related U.S. Application Data

[63] Continuation of application No. 08/380,611, Jan. 30, 1995, abandoned.

[30] Foreign Application Priority Data

Jan. 31, 1994 [JP] Japan .................................. 6-009564

[51] Int. Cl.⁶ ...................................................... G06K 9/00
[52] U.S. Cl. .......................... 382/162; 382/165; 382/166; 382/167
[58] Field of Search ..................................... 382/162, 165, 382/167, 166; 348/453; 358/538, 527, 518, 523; 395/109, 131

[56] References Cited

U.S. PATENT DOCUMENTS

| | | | |
|---|---|---|---|
| 4,204,728 | 5/1980 | Goshima et al. | 355/4 |
| 4,958,220 | 9/1990 | Alessi et al. | 358/527 |
| 4,979,032 | 12/1990 | Alessi et al. | 358/527 |
| 5,136,399 | 8/1992 | Aoyama | 358/296 |
| 5,208,903 | 5/1993 | Curry | 395/131 |
| 5,257,097 | 10/1993 | Pineau et al. | 358/500 |
| 5,296,947 | 3/1994 | Bowers | 358/527 |
| 5,311,336 | 5/1994 | Kurita et al. | 358/80 |
| 5,313,291 | 5/1994 | Appel et al. | 358/501 |
| 5,444,544 | 8/1995 | Oka et al. | 358/332 |
| 5,481,655 | 1/1996 | Jacobs | 395/109 |
| 5,485,283 | 1/1996 | Kaneko | 358/518 |
| 5,497,431 | 3/1996 | Nakamura | 382/162 |
| 5,668,890 | 9/1997 | Winkelman | 382/167 |

*Primary Examiner*—Bipin H. Shalwala
*Assistant Examiner*—Kanji Patel
*Attorney, Agent, or Firm*—Fitzpatrick, Cella, Harper & Scinto

[57] ABSTRACT

An image processing method generates color image data for previewing an object image to be formed by a color image forming apparatus. The method discriminates a type of the object image based on color image data for the object image, and generates color image data for previewing the object image by performing a color conversion process on the color image data for the object image. The color conversion process is performed in accordance with the type of the object image.

12 Claims, 16 Drawing Sheets

IMAGE PROCESSING SYSTEM WHICH GENERATES PREVIEW IMAGE DATA IN ACCORDANCE WITH THE TYPE OF IMAGE TO BE PREVIEWED

This application is a continuation of application Ser. No. 08/380,611 filed Jan. 30, 1995, now abandoned.

BACKGROUND OF THE INVENTION

1. Field of the Invention

The present invention relates to an image processing apparatus and an image processing method for realizing a print preview function mainly used in a color system.

2. Related Background Art

For the purpose of confirming, prior to the printing of information, how the image will appear on the print for example on a cathode ray tube, there is already known so-called preview function by preparing image information for monitoring, taking the difference in color reproduction range between the monitor and the printer into consideration.

More specifically, in a system as shown in FIG. 1, in which a document or the like is prepared in a host computer 11, then edited in an unrepresented editor and printed by an output device 21, the state of image output is confirmed prior to the actual image output in order to achieve improvement in the efficiency of operation or economization of materials.

However, such conventional method merely considers the difference in the color reproduction range, and, in case the color reproduction process is modified in the printer device 21 based on the data format, the conventional preview function is unable to respond to the color reproduction process in the printer device 21 and to provide proper previewing display.

SUMMARY OF THE INVENTION

An object of the present invention is to provide an image processing method and an apparatus therefor, not associated with the above-mentioned drawback.

Another object of the present invention is to provide a more exact preview image, in comparison with the output image by an output device to be used.

Still another object of the present invention is to provide a more exact preview image, for an output device effecting color reproduction according to the image data.

The above-mentioned objects can be attained, according to the present invention, by an image processing method featured by effecting a color processing according to the kind of the image information, and effecting preview display based on the image information subjected to said color conversion process.

Still other objects and configurations of the present invention will become fully apparent from the following description, to be taken in conjunction with the attached drawings, and also from the appended claims.

DETAILED DESCRIPTION OF THE PREFERRED EMBODIMENTS

[First embodiment]

In the following there will be explained in detail a preferred embodiment of the present invention with reference to the attached drawings. Said embodiment consists of a system in which a preview function, corresponding to a color printer device capable of switching the color process for an ordinary image and a computer graphic (CG) image, is realized in a host equipment.

In said ordinary image, each pixel is represented by multi-value data composed of plural components, while in said CG image, each pixel is represented by code data.

[1.1 Color printer to be used]

The color printer to be used in the present embodiment is capable of optimum color reproduction by switching the color reproduction process according to the kind of the input image data, for example applying "more preferred color reproduction" in the output of an ordinary image and "color reproduction minimizing the color difference" in the output of a CG image.

Figure 1:
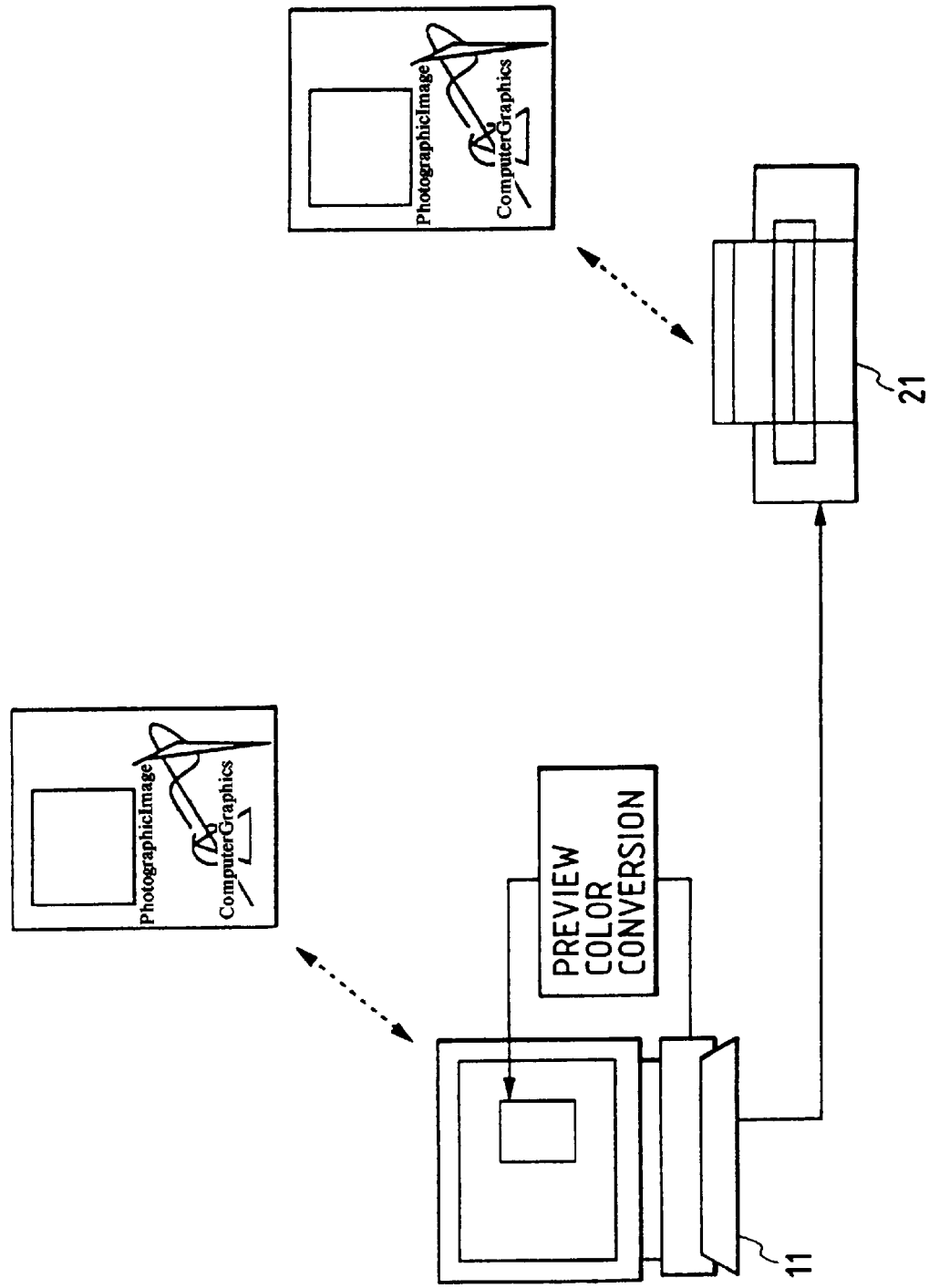
FIG. 1 is a schematic view showing the preview function of the print preview function in a conventional color system.
Figure 2:
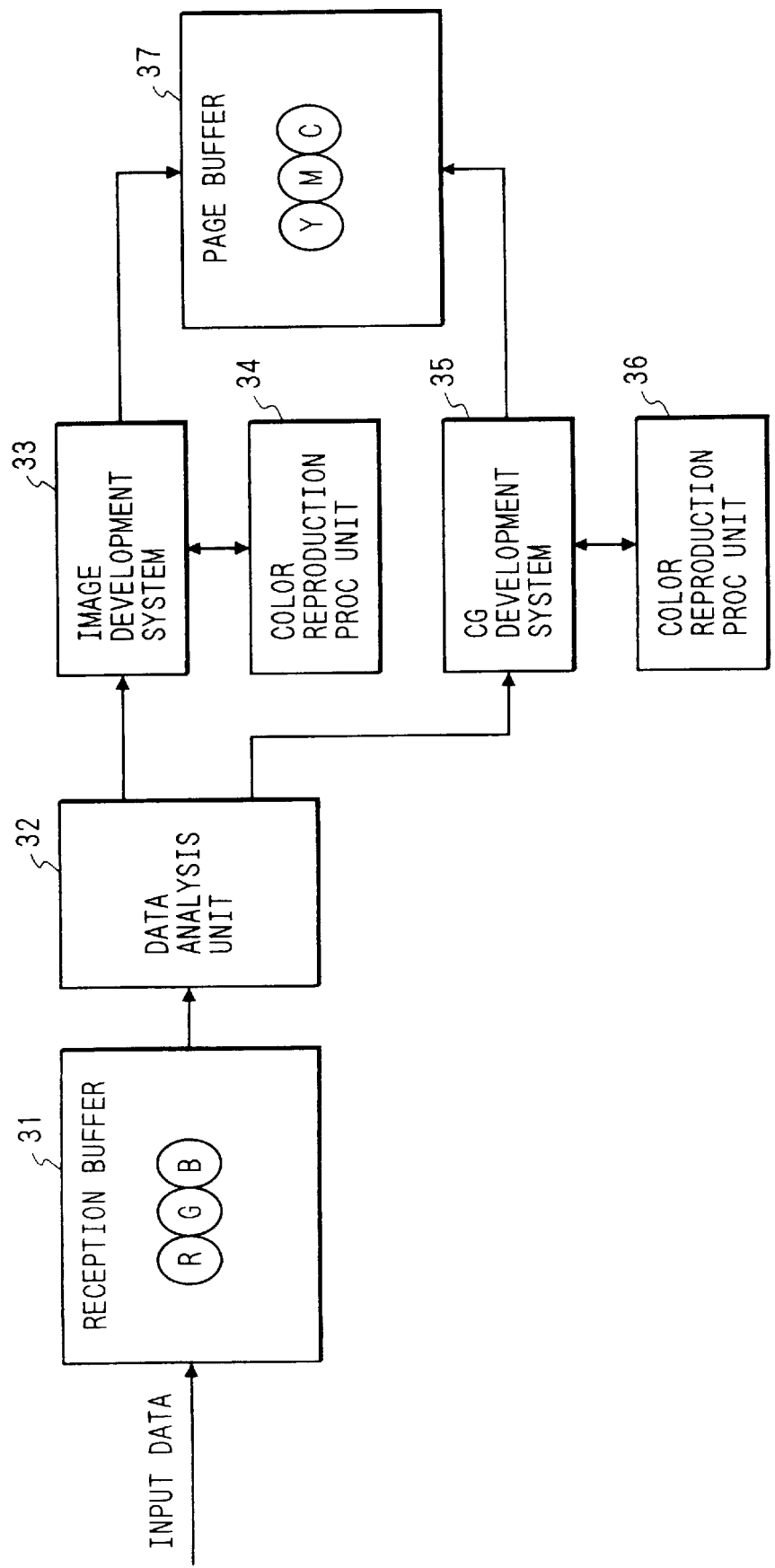
FIG. 2 is a view showing an internal process in a printer to be used in the present invention.

FIG. 2 shows an example of the internal process, relating to the color reproduction process, in the printer to be used.

Input data are temporarily stored in a reception buffer 31 and then analyzed in a data analysis unit 32, for identifying the kind of the data, from the data format. If the input data are image data, a pixel size and R, G, B values are arranged in point serial format. If the input data are CG data, data representing the kind of graphics, coordinate values thereof and R, G, B data designating the color thereof are arranged in a format matching the processing system of said CG data. These data are analyzed in the data analysis unit 32, and the sequence branches to a development system matching the processing for such data. In case of processing image data, the sequence proceeds from the data analysis unit 32 to an image development system 33 to effect data conversion to Y, M, C data by referring to a color reproduction process unit 34 and to develop data in a page buffer 37. In case of processing CG data, the sequence proceeds from the data analysis unit 32 to a CG development unit 35 to effect data conversion to Y, M, C data by referring to a color reproduction process unit 36 and to develop data in the page buffer 37.

The color reproduction process 36 is intended for color equalization, corresponding to the CG development system, and is designed to effect sampling uniformly in the entire color space and to minimize the color difference, while the color reproduction process 34 is designed to achieve preferred color matching, corresponding to the image development system, namely to provide preferred color reproduction for the important colors (such as human skin color) in the images in the natural environment.

The printer device to be used in the present invention is not limited to the one explained above but can be any printer capable of varying the color reproduction process according to the kind of image information such as a printer device adapted to switch the color reproduction process for each object.

[1.2 Outline of system configuration and print preview function]

Figure 3:
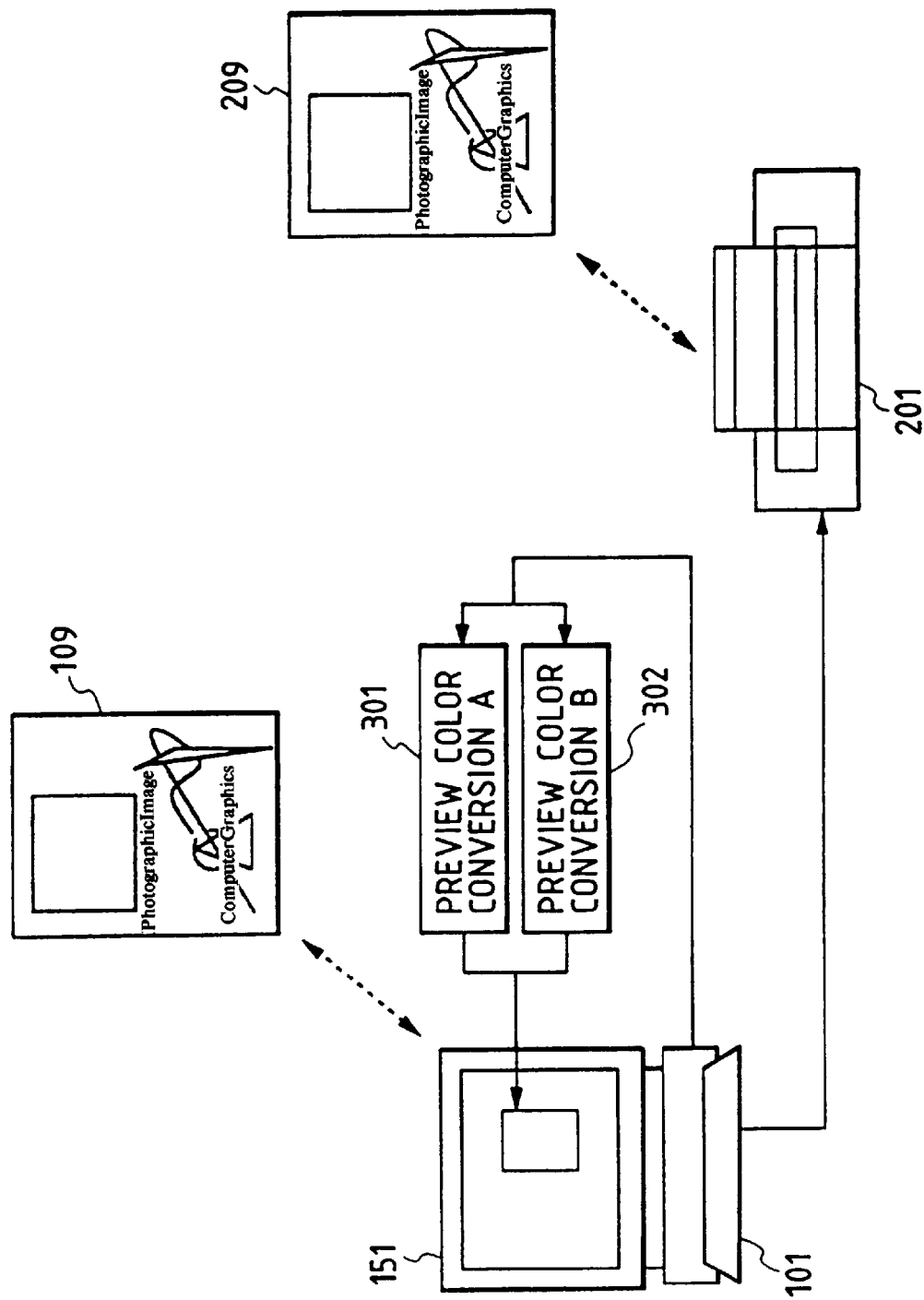
FIG. 3 is a schematic view showing a preview function of the present invention.

FIG. 3 is a schematic view showing the outline of the system configuration and the print preview function of the present embodiment.

When print data are transmitted from a host computer 101 to a printer device 201, there is generated a printed image 209. Also on a monitor CRT 151, there is displayed a preview image 109 generated by a color conversion process and a preview color conversion A-301 or B-302, corresponding to the color reproduction process to be conducted in the printer device 201.

The host equipment has plural color conversion processes, corresponding to all of the plural color conversion processes provided in the printer device 201.

The preview display is to faithfully display, on the monitor CRT 151, the output image obtained in the output device, i.e. the printer device 201 in the present embodiment, which receives and reproduces the transferred color image information.

[1.3 System outline]

Figure 4:
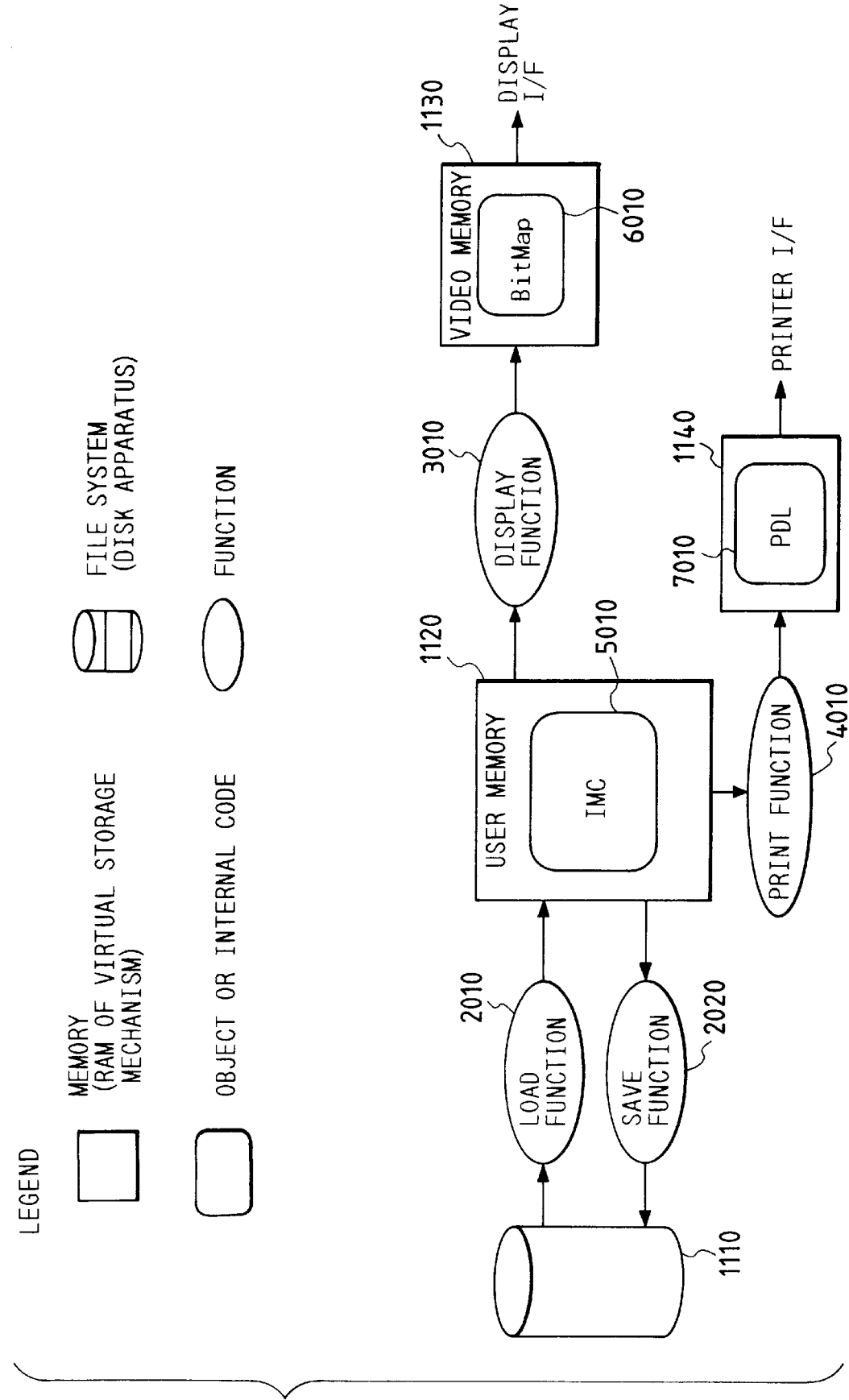
FIG. 4 is a schematic block diagram showing an example of the color system including the print preview function.

FIG. 4 is a block diagram showing the outline of the process in the system of the present embodiment. The data IMC 5010 to be processed are loaded from a file system 1110, through a load function 2010, to a user memory 1120. Said data IMC 5010 are subjected, when required, to an editing operation by unrepresented editing functions, or saved in a file system 1110 through the process of a save function 2020.

The data IMC 5010 loaded in the user memory 1120 are developed, through a display function 3010, as bit map data 6010 in a video memory 1130, and are then suitably displayed, through a video interface, on the monitor CRT 151.

With respect to the display on the monitor CRT 151, the display function 3010 is varied according to whether the user designates "preview display" or "normal display".

On the other hand, in the output to the printer device, the data IMC 5010 are converted, through a print function 4010, into PDL codes 7010, then temporarily stored in a print buffer memory 1140 and then suitably supplied to the printer 201 through a printer interface.

[1.4 Normal display and preview display]

The present embodiment has two display modes, one being the display normally given in the course of editing operation, and the other being given for the purpose of preview. For the purpose of distinguishing, the former will be called "normal display" while the latter will be called "preview display".

The "normal display" or the "preview display" can be designated by the user through an operation unit of the host computer 11.

The display function 3010 in FIG. 4 includes both display modes, and the details of the relating processes will be explained in the following with reference to FIGS. 5, 6, 7 and 8.

[1.5 Explanation of the display function]

Figure 5:
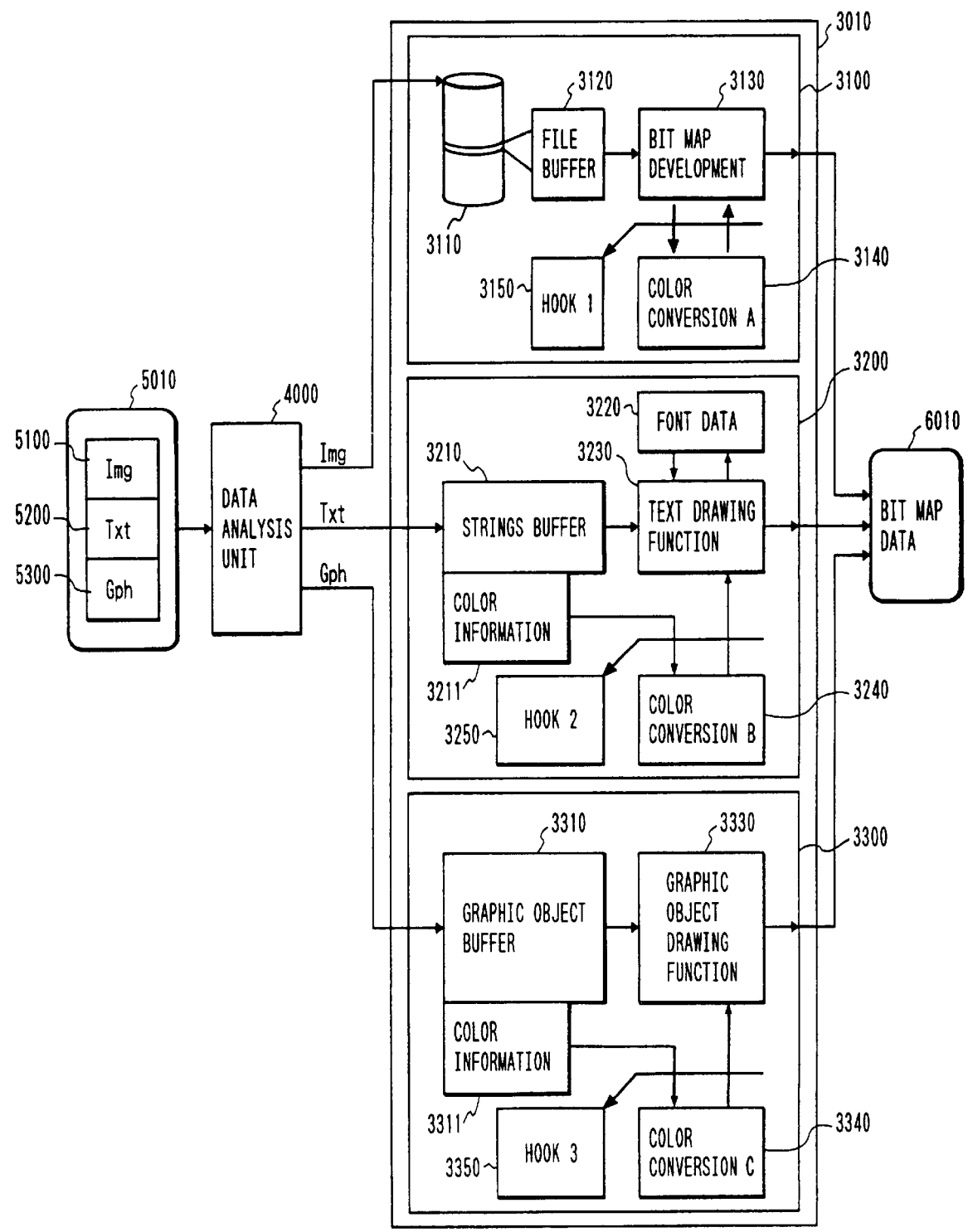
FIG. 5 is a block diagram showing a schematic process of a display function 3010.

FIG. 5 is a block diagram showing the outline of the process of the aforementioned display function 3010, and represents the mode of conversion of the data IMC 5010, to be processed, into the bit map data 6010 by the display function 3010. The details of the process will be explained in the following.

The data IMC 5010 are composed, for example, of three objects (image, text and graphics), which can be respectively divided into an image file name Img-5100, a strings object Txt-5200 and a graphic object Gph-5300. These data group is processed by internal modules of the display function 3010 and is finally converted into the bit map data 6010.

The display function 3010 is composed of three modules 3100, 3200, 3300 respectively corresponding to the data (image, text and graphics), and, in each module, the normal display and the preview display can be switched by suitable use of hook mechanisms 3150–3350.

The module 3100 is provided for developing the image object into the bit map, and generates bit map data 6010 through a bit map development function 3130, by transferring the image data to a file buffer 3120 and referring to a file stream 3110 designated by the image file name Img-5100.

In this operation, the bit map development function 3130 selects a branch to a color conversion process 3140 by a hook mechanism 3150, which either passes the color conversion in order to effect the "normal display" or effects the color conversion in order to effect the "preview display".

The module 3200 is provided for developing the text object into the bit map, and effects suitable transfer of the strings object Txt-5200 to a strings buffer 3210 and a color information designating field 3211 prepared by functions, and then development into the bit map data 6010 with reference to font data 3220 by a text drawing function 3230.

In this operation, the text drawing function 3230 selects a branch to a color conversion process 3240 by a hook mechanism 3250, which either passes the color conversion in order to effect the "normal display" or effects the color conversion in order to effect the "preview display".

The module 3300 is provided for developing the graphic object into the bit map, and effects suitable transfer of the graphic object Gph-5300 to a graphic object buffer 3310 and a color information designating field 3311 prepared by functions, and then development into the bit map data 6010 by the graphic object drawing function 3330.

In this operation, the graphic object drawing function 3330 selects a branch to a color conversion process 3340 by a hook mechanism 3350, which either passes the color conversion in order to effect the "normal display" or effects the color conversion in order to effect the "preview display".

The hook mechanisms 3150, 3250, 3350 are controlled by an unrepresented CPU, based on the designation of the user.

Consequently it is rendered possible to reproduce, by the preview function on the display device, the particular effects obtainable by the image processing in the printer to be used (including, in the present embodiment, the "more preferred color reproduction" for the ordinary images and the "color reproduction minimizing the color difference" for CG images such as texts or graphics), so that the user can observe, on the display device, an image closer to the image to be reproduced on the printer device.

Also these operations can be realized by a simple configuration of switching the color conversion processes by the hook mechanisms.

[1.6 Process flow in the entire system]

In the following the branching to the color conversion processes by the hook mechanisms 3150, 3250, 3350 will be explained with reference to flow charts shown in FIGS. 6, 7 and 8.

Figure 6:
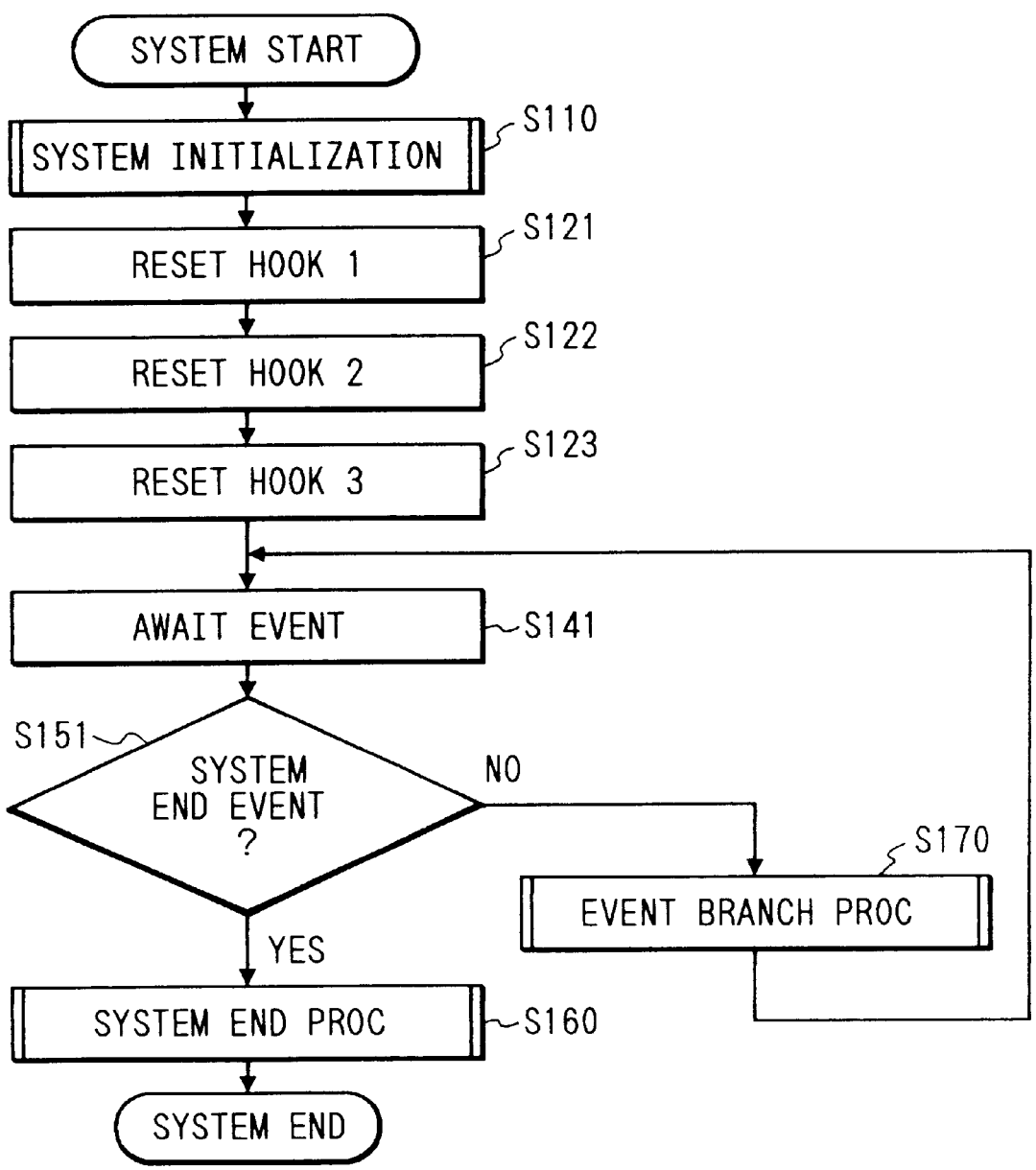
FIG. 6 is a schematic flow chart showing the process of the entire system in a first embodiment.

FIG. 6 is a schematic flow chart showing the process of the entire system. The system of the present embodiment basically employs an even-driven process, repeating a waiting step for an event and a branching step to the event until a final event is reached.

When the system is activated, a step S110 effects initialization of the system (securing the areas for variables etc. and initialization of variables and structure).

Then steps S121, S122 and S123 effect initialization (resetting) of the hook mechanisms Hook1, Hook2, Hook3. The resetting of the hook mechanisms (a kind of flag) is particularly written as it is important in the construction of the present embodiment.

After all the initializating operations, the sequence proceeds to a step S141 to enter a state waiting for an event. In the waiting state in the step S141, the sequence does not proceed unless an event occurs, but proceeds to a next step when the event occurs. A next step S151 discriminate whether said event is a system ending event, and, if so, the sequence immediately proceeds to a system ending step S160 to terminate the sequence. In case of another event, the sequence proceeds to an event branching step S170 to effect a process matching the occurring event.

The events considered in this sequence include two independent events of "normal display" and "preview display" for the data display, in addition to those such as "re-drawing of image frame", and the event branching step S170 effects suitable process according to the encountered event.

Figure 7:
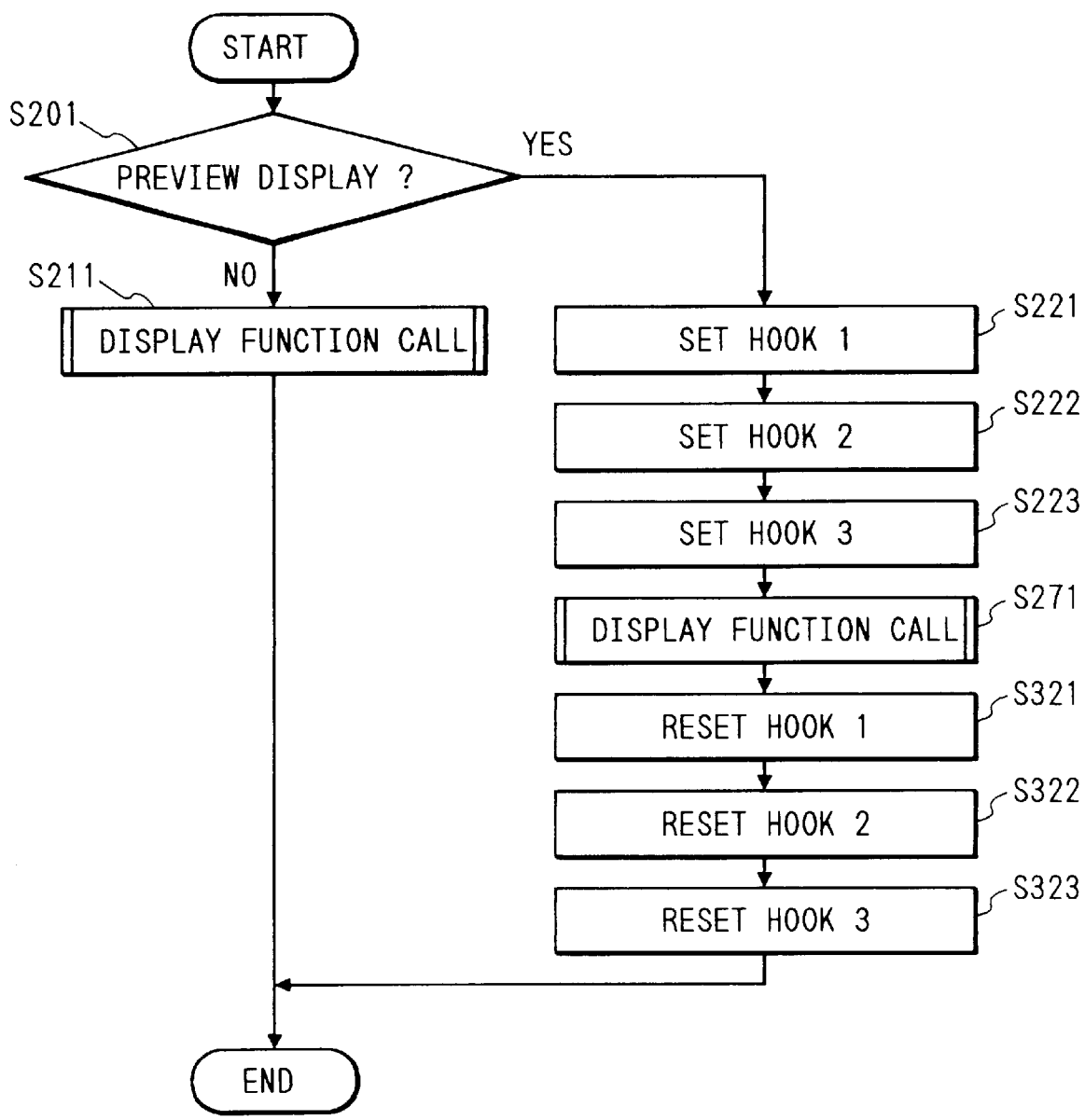
FIG. 7 is a schematic flow chart showing a process for switching normal display and preview display.

FIG. 7 is a schematic flow chart showing the outline of the process for switching the "normal display" and the "preview display" included in the events in the present system.

For the two independent events "normal display" and "preview display", the sequence proceeds from the event branching step S170 in FIG. 6 to a step S201.

The step S201 discriminates, by an unrepresented flag indicating the kind of the event, whether the data to be drawn on the display device are for the "preview display", and the sequence branches to a step S221 in case said event is the "preview display", but to a step S211 in other cases.

The step S211 executes a display function for the "normal display". In this step S211, the color conversion is not executed because the display function is called without the hook setting (as will be explained later in relation to FIG. 8). Subsequently the sequence is terminated.

Steps S221, S222 and S223 set the Hook1, Hook2 and Hook3, in order to effect the color conversion for the "preview display".

A next step S271 calls the display function for the "preview display". In this case the color conversion for the "preview display" is executed because the display function is called after the hook setting (as will be explained later in relation to FIG. 8).

Then steps S321, S322 and S323 reset the Hook1, Hook2 and Hook3 in order not to execute the color conversion, for the "normal display". Thereafter the sequence is terminated.

Figure 8:
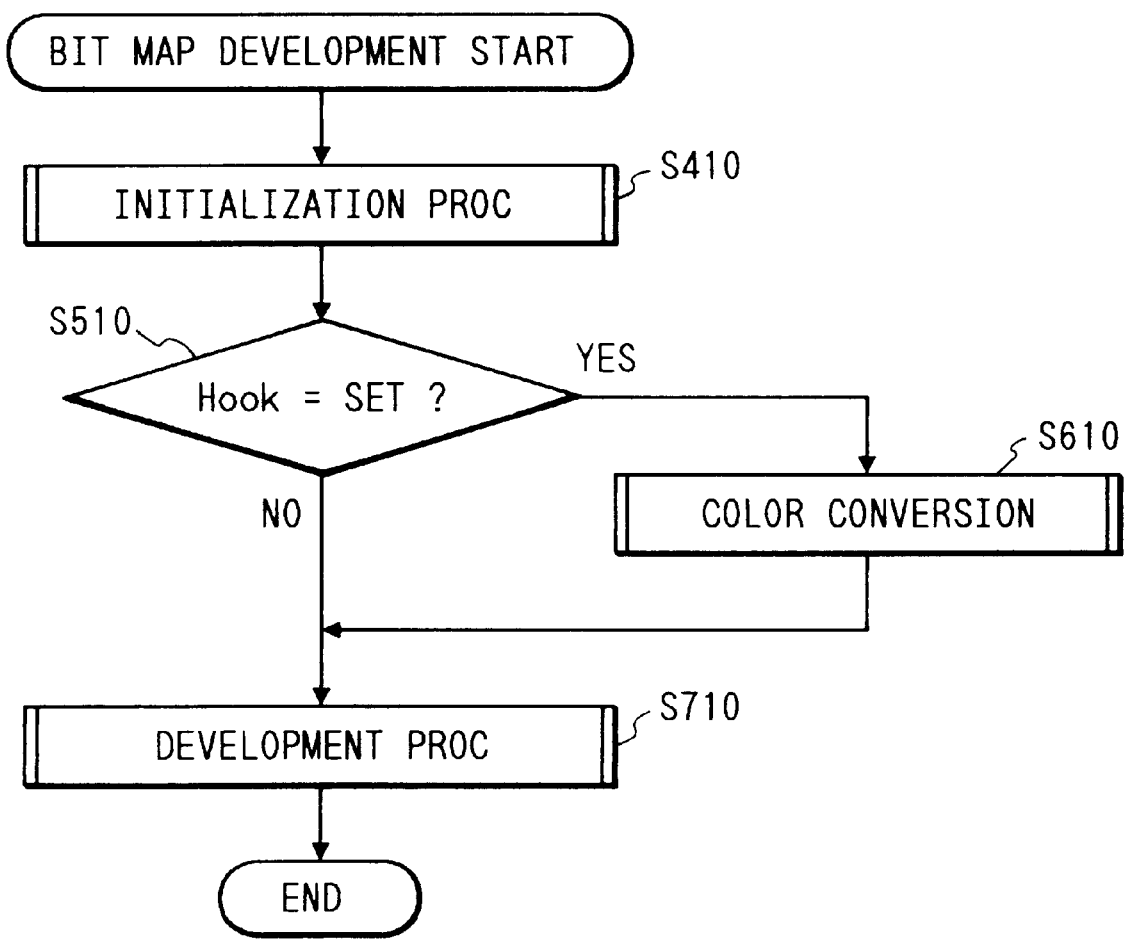
FIG. 8 is a schematic flow chart showing a process of a hook mechanism.

FIG. 8 is a flow chart showing the outline of the process of the hook mechanism.

At first a step S410 executes initialization, and then a step S510 discriminates whether the hook mechanism is set.

If the hook mechanism is set, the sequence branches to a step S610 to execute the color conversion for the "preview display", and a step S710 effects a development process. In this case, the colors to be drawn are converted to "the colors reproducing the colors of the printed output on the monitor".

In case of non-setting of the hook, the sequence immediately proceeds to a step S710 to effect development process. In this case the colors to be drawing are same as those of the data.

Based on this schematic flow chart, the processes in the three modules shown in FIG. 5 can be interpreted as follows.

In case of the image drawing function, the hook in the step S510 is the Hook1, and the development process in the step S710 is the bit map drawing function.

In case of the text drawing function, the hook in the step S510 is the Hook2, and the development process in the step S710 is the text drawing function.

In case of the graphic object drawing function, the hook in the step S510 is the Hook3, and the development process in the step S710 is the graphic object drawing function.

Thus the image processing is executed according to the format of the data, as in the image processing in the printer to be used.

[1.7 Color conversion]

In the following there will be explained, with reference to FIGS. 9 and 10, the conversion to "the colors reproducing the colors of the printed output on the monitor".

At first there will be explained how the colors of the printed output and those of the monitor display are obtained from the input data.

[1.7.1 Colors on the printer]

Figure 9:
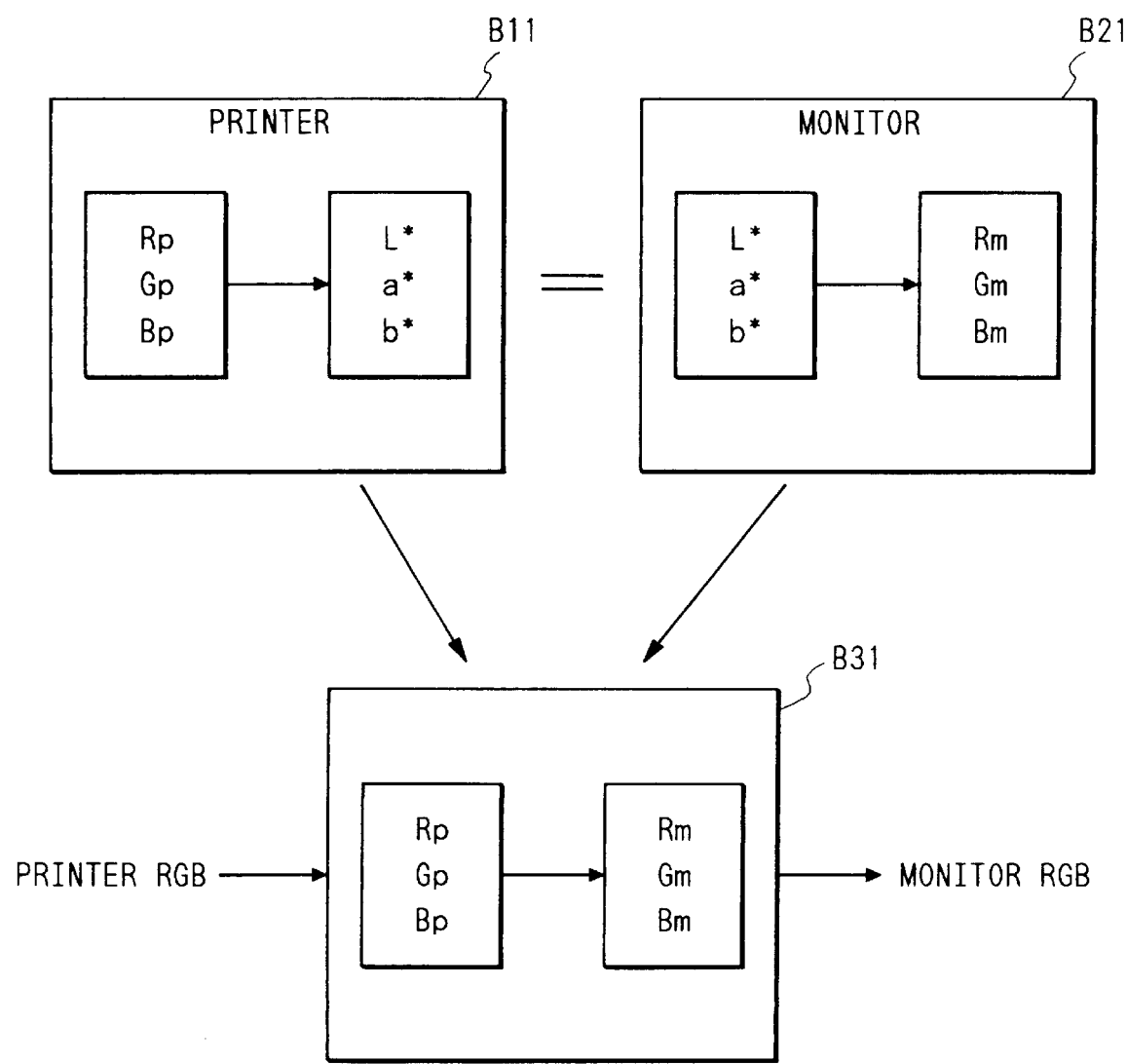
FIG. 9 is a view showing the concept for generating a function for obtaining monitor colors corresponding to the print colors.

A block B11 in FIG. 9 shows a function providing output colors L*, a*, b* in response to input data Rp, Gp, Bp by means of a look-up table (LUT) and an interpolating calculation to be explained in the following.

The block B11 is different depending on the image, as the color reproduction process in the printer device is selected differently for the ordinary image and the CG image.

In the color printer 201 to be used in the present invention, the colors of the image to be generated are designated by the R, G, B values. Said R, G, B values are quantized by 8 bits each, or 24 bits in total, and are converted, by an internal color process, to Y, M, C, K values to be used for actual printing on the paper. As the number of combinations of the R, G, B values is equal to $2^{24}$, there can be designated about 16.77 million colors in the color printer 201.

It is therefore necessary to know the mutual correspondences between the "R, G, B values" supplied to the printer and the "printed colors". For this purpose it is necessary to print the colors with all the R, G, B values and to determine the correspondences to the three stimulation values X, Y, Z or the L*, a*, b* values by the measurement of these printed colors. However, since such measurement of all the colors of such enormous number is inefficient, the present embodiment obtains approximate values, instead of printing all the colors, by measuring sample points and effecting interpolations utilizing a train of thus obtained sample points (details of the interpolation being explained later). Said train of the sample points is a group of points equally divided on each axis in the RGB color space, and is called the LUT.

[1.7.2 Colors on the monitor]

A block B21 in FIG. 9 shows a function for providing Rm, Gm, Bm values corresponding to the L*, a*, b* values on the monitor.

Stated differently, when the Rm, Gm, Bm values are supplied to the monitor, it displays colors having the corresponding L*, a*, b* values.

The conversion from the L*, a*, b* values to the R, G, B values is executed through the X, Y, Z values. More specifically, there is at first executed the conversion from the L*, a*, b* values to the X, Y, Z values according to the definition, and there is then executed the conversion to the R, G, B values. In the present case, the conversion from the R, G, B color space to the X, Y, Z color space is conducted by linear projection. The linear conversion is executed by a 3×3 matrix, of which parameters are determined by the characteristics of the monitor. As an example, a monitor provided the following parameters for the conversion from the X, Y, Z color space to the R, G, B color space:

R=4.97X −2. 59Y −1. 03z

G=−2. 12X+3. 12Y −0. 02Z

B=0. 009X−0. 39Y +1. 29Z

[1.7.3 Method of reproducing print colors on the monitor]

A block B31 represents the "preview color conversion function" for receiving the colors Rp, Gp, Bp supplied to the printer and providing monitor colors Rm, Gm, Bm for obtaining a color corresponding thereto (a color close in the L*a*b* color space). This function is composed of a LUT and an interpolating calculation.

For generating the LUT used in said block B31, there are required the functions of the blocks B11 and B21.

The block B31 is different for the ordinary image and for the CG image, because the block B11 is different for these images as explained before. As the "preview color conversion function" is generated for each of the color conversions A and B in this manner, there can be provided, on the display device, an image closer to that to be reproduced on the printer device.

[1.7.4 Generation of LUT for preview color conversion function (LUT of B31)]

Figure 10:
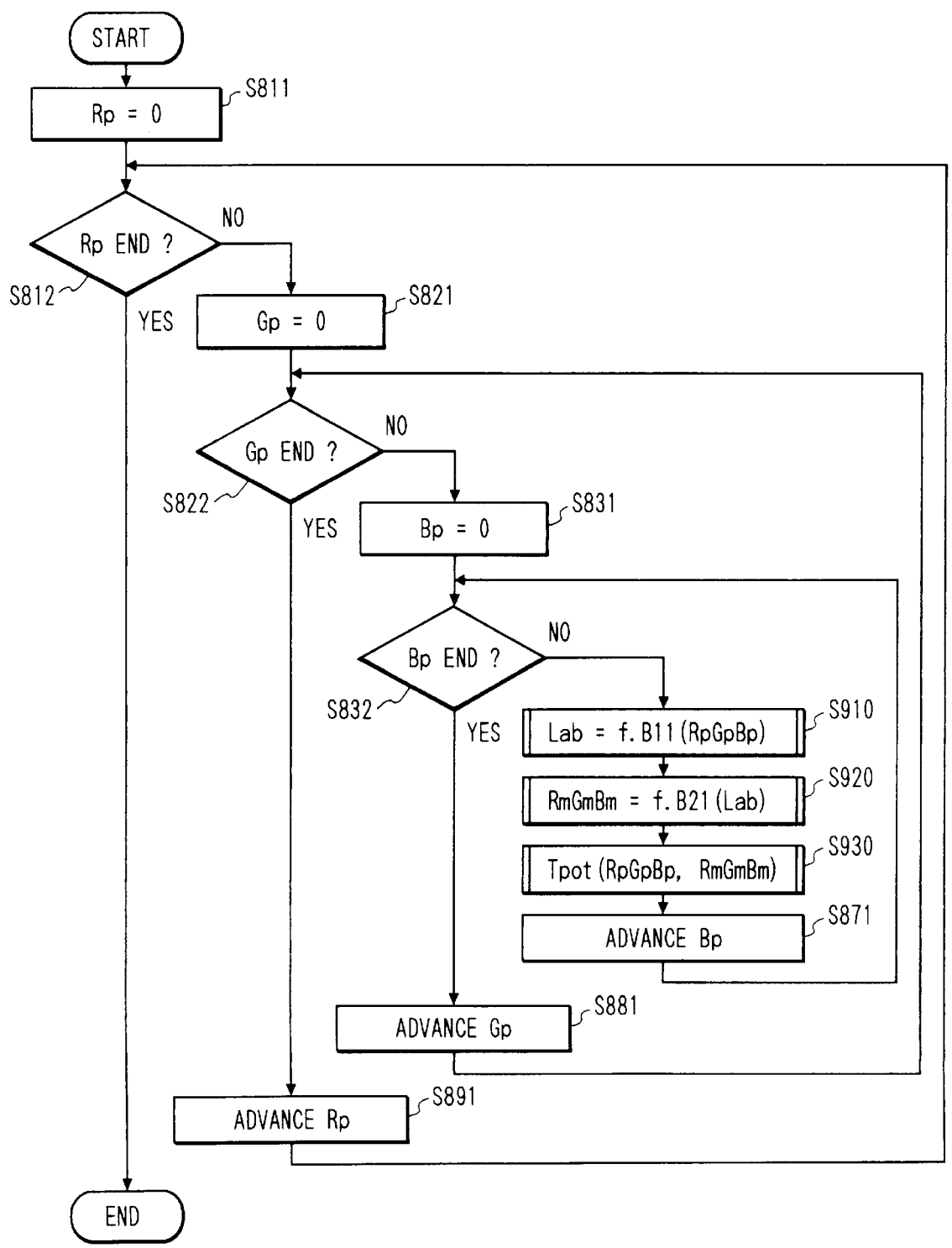
FIG. 10 is a flow chart showing a process for generating a look-up table for obtaining monitor colors corresponding to the print colors.

FIG. 10 is a schematic flow chart showing the process for generating the LUT to be used in the "preview color conversion function".

In the present embodiment, for 729 combinations of the colors Rp, Gp, Bp supplied to the printer, corresponding monitor colors Rm, Gm, Bm are determined by two prediction functions, namely "printer output color prediction function" and "monitor input color prediction function".

The samples on the LUT are obtained by interpreting the Rp, Gp, Bp colors as a color space and by samplings at constant intervals on each of the Rp, Gp, Bp axes. As an example, the samplings are conducted with an interval of 32, assuming that each axis has a defined range of 0 to 255. Since each of the R, G, B colors is sampled as 0, 32, 64, . . . , 224, 255, there are obtained following combinations:

| No. | Rp | Gp | Bp |
|---|---|---|---|
| 1: | 000 | 000 | 000 |
| 2: | 000 | 000 | 032 |
| 3: | 000 | 000 | 064 |
| . | | | |
| 10: | 000 | 032 | 000 |
| 11: | 000 | 032 | 032 |
| . | | | |
| 82: | 032 | 000 | 000 |

-continued

| No. | Rp | Gp | Bp |
|---|---|---|---|
| 83: | 032 | 000 | 032 |
| . | | | |
| 728: | 255 | 255 | 224 |
| 729: | 255 | 255 | 255 |

The "LUT for preview color conversion function" is prepared by generating these combinations in succession by a triple loop composed of steps S811 to S832 and steps S881 to S891, then entering these combinations to a "printer output color prediction function f_B11( )" represented by a step S910 to obtain the printer output colors or L*a*b* values, then entering these values into a "monitor input color prediction function f_B21( )" represented by a step S920 to obtain the Rm, Gm, Bm values to entered into the monitor, and transferring these values to a "LUT generating function Tput( )" represented by a step S930.

[1.7.5 Switching of the preview color conversion function LUT]

The color printer 201 to be used in the present embodiment has two color reproduction processes, i.e. the "color reproduction process unit 34" and the "color reproduction process unit 36" shown in FIG. 2.

The former is used for the image data, while the latter is used for the text data and graphic data.

Consequently the correspondence between the "RGB values" and the "print color" exists in two ways, and, for this reason, there are provided two LUT's for defining said correspondence.

Said two LUT's can be generated by the procedure explained above in relation to FIG. 10, in which, however, the LUT used in the "printer output color prediction function f_B11( )" in the step S910 is suitably switching a printer output color prediction function corresponding to either of the two color reproduction processes, i.e. the "color reproduction process unit 34" and the "color reproduction process unit 36".

[1.7.6 Interpolating calculation]

Figure 11:
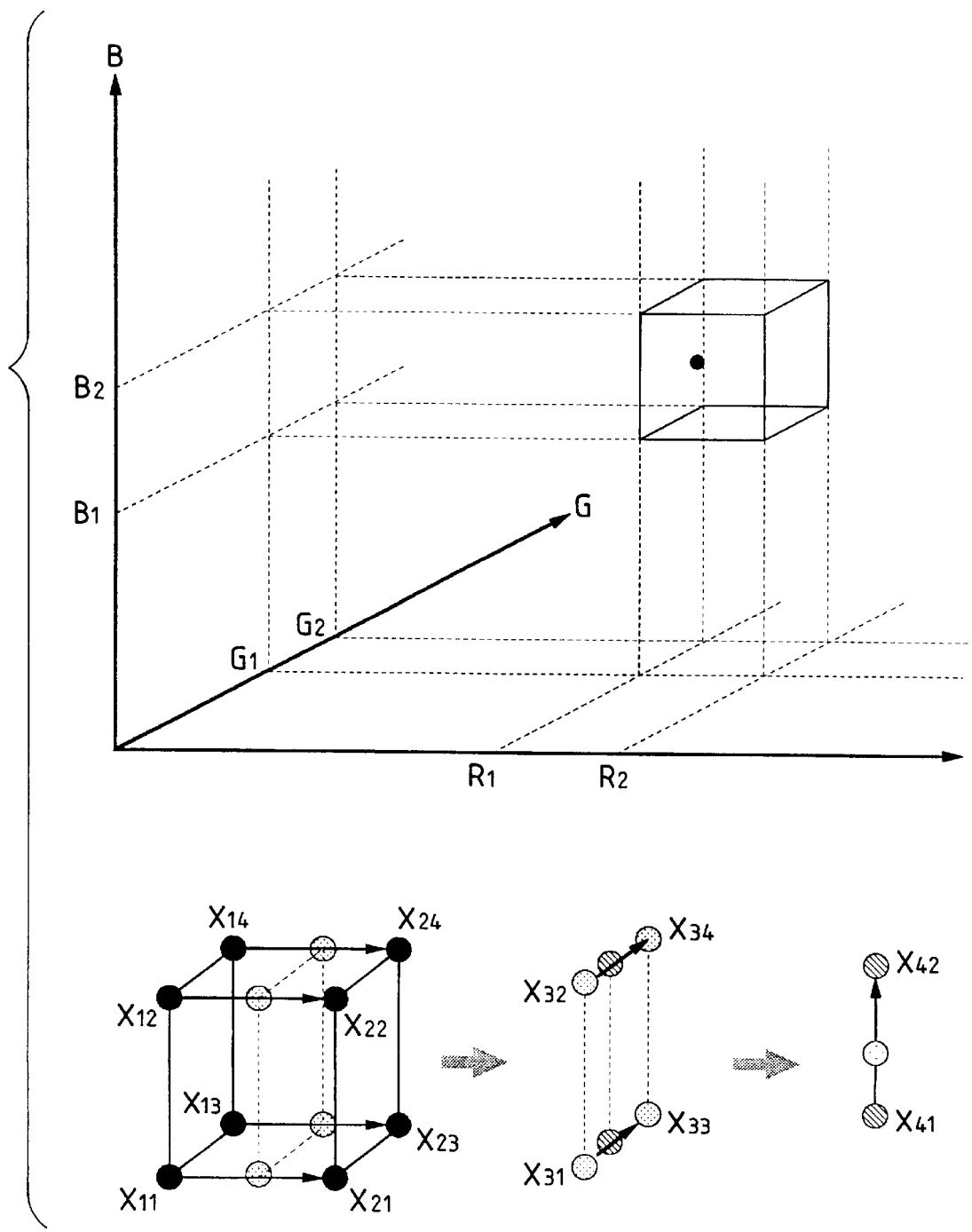
FIG. 11 is a conceptual view showing an example of linear interpolation in a three-dimensional Euclid space.

In the following there will be explained the interpolating calculation in the present embodiment, with reference to FIG. 11. It is assumed that an arbitrary point P(r, g, b) in a RGB space (three-dimensional Euclid space) is surrounded by a group of points X:

X11 (r1, g1, b1), X12 (r1, g1, b2), X13 (r1, g2, b1),
X14 (r1, g2, b2)
X21 (r2, g1, b1), X22 (r2, g1, b2), X23 (r2, g2, b1),
X24 (r2, g2, b2)
wherein r1<r<r2, g1<g<g2 and b1<b<b2 stand.

Also there is assumed the presence of a group of points L:
L11, L12, L13, L14, L21, L22, L23, L24

It is now considered to realize a conversion from X to L by a LUT, and to determine an output value L corresponding to the point P(r, g, b) by an interpolating calculation.

At first the interpolation in the direction of the R axis is conducted in the following manner.

From the output values of the points X11(R1, G1, B1) and X21(R2, G1, B1), the output value L31 at a point X31(r, G1, B1) is determined by interpolation.

Then, from the output values of the points X12(R1, G1, B2) and X22(R2, G1, B2), the output value L32 at a point X32(r, G1, B2) is determined by interpolation.

Also from the output values of the points X13(R1, G2, B1) and X23(R2, G2, B1), the output value L33 at a point X33(r, G2, B1) is determined by interpolation.

Also from the output values of the points X14(R1, G2, B2) and X24(R2, G2, B2), the output value L34 at a point X34(r, G2, B2) is determined by interpolation.

The output values L31, L32, L33, L34 can be obtained by the following linear interpolations:

$$L31=(r-R1)*(L21-L11)/(R2-R1)+L11$$

$$L32=(r-R1)*(L22-L12)/(R2-R1)+L12$$

$$L33=(r-R1)*(L23-L13)/(R2-R1)+L13$$

$$L34=(r-R1)*(L24-L14)/(R2-R1)+L14$$

Then the interpolation in the direction of the G-axis is conducted in the following manner.

From the output values of the points X31(r, G1, B1) and X33(r, G2, B1), the output value L41 at a point X41(r, g, B1) is determined by interpolation.

Then, from the output values of the points X32(r, G1, B2) and X34(r, G2, B2), the output value L42 at a point X42(r, g, B2) is determined by interpolation.

The output values L41, L42 can be determined by the following linear interpolations:

$$L41=(g-G1)*(L33-L31)/(G2-G1)+L31$$

$$L42=(g-G1)*(L34-L32)/(G2-G1)+L32$$

Finally, the interpolation in the direction of the B-axis is conducted in the following manner.

From the output values of the points X41(r, g, B1) and X42(r, g, B2), the output value L51 at a point X51(r, g, b) is determined by the interpolation.

The output value L51 can be determined by the following linear interpolation:

$$L51=(b-B1)*(L42-L41)/(B2-B1)+L41$$

The output value L51 at an arbitrary point P in the RGB space can be determined by the above-explained procedure.

[2nd embodiment]

In the following a second embodiment of the present invention will be explained with reference to FIGS. 12, 13 and 14.

[2.1 Outline of process]

Figure 12:
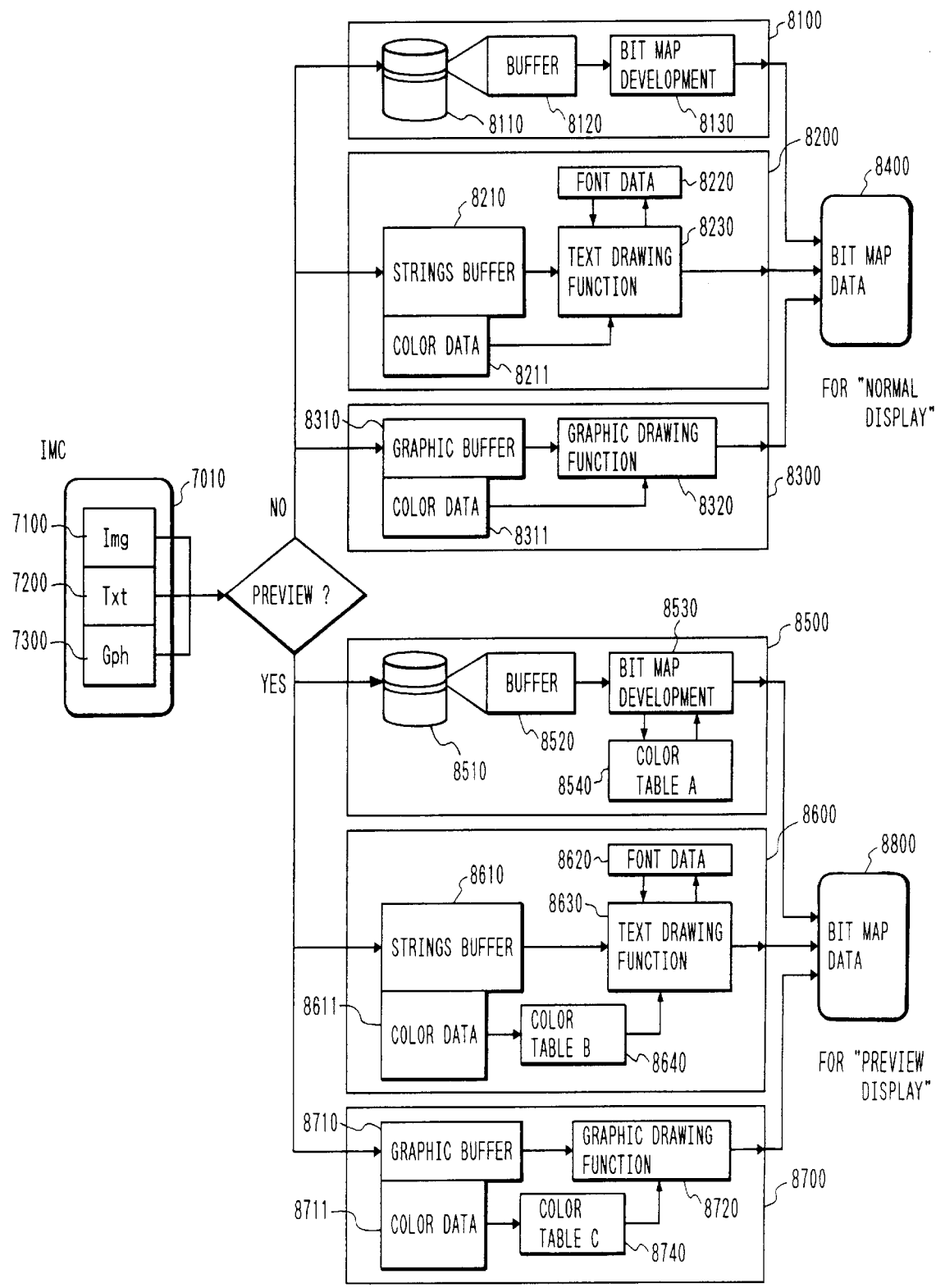
FIG. 12 is a block diagram showing an example of a second embodiment.
Figure 13:
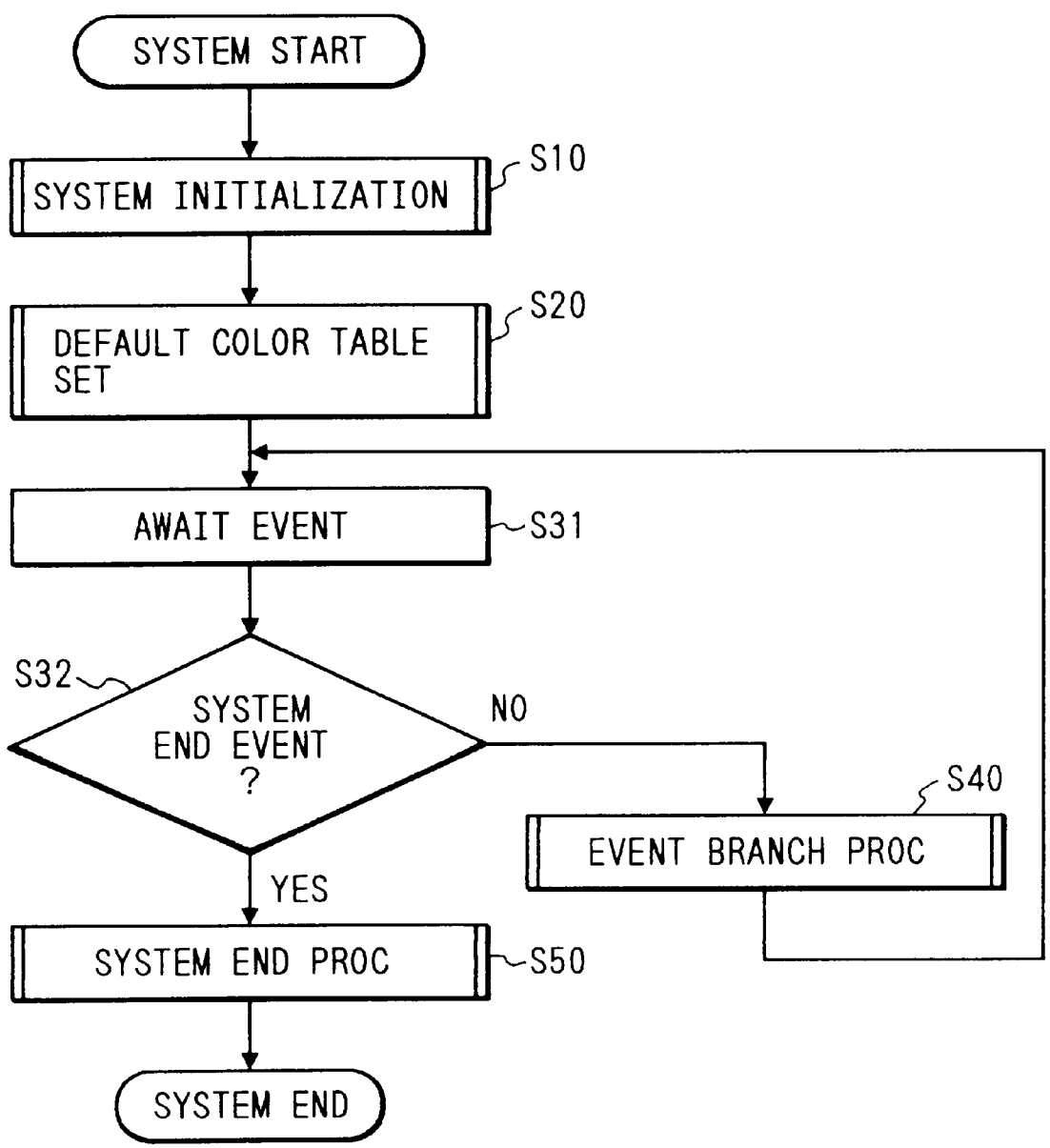
FIG. 13 is a schematic flow chart showing the process of the entire system in the second embodiment.

FIG. 12 is a block diagram showing the outline of the process in the display function in the second embodiment.

Data IMC 7010 are composed of three objects (image, text and graphics), i.e. an image file name IMG-7100, a string object Txt-7200 and a graphic object Gph-7300. These data are processed by modules 8100–8300 or 8500–8700, and are finally converted into bit map data 8400 or 8800. The modules 8100–8300 are for processing for "normal display", while the modules 8500–8700 are for processing for "preview display". Also the bit map data 8400 and 8800 are respectively for the "normal display" and for the "preview display".

The modules for "normal display" are divided into 8100, 8200 and 8300 according to the kind of data (image, text, graphics). In each module, the bit map development is conducted in direct manner, without passing a color table or the like.

[2.2 Explanation on the block diagram]

The module 8100, for bit map development of an image object, generates bit map data 8400 through a bit map development function 8130, by suitably transferring the image data to a file buffer 8120 while referring to a file stream 8110 designated by the image file name Img-7100.

The module 8200, for bit map development of a text object, effects suitable transfer of the strings object Txt-7200 to a strings buffer 8210 and a color information designation field 8211 which are temporary areas prepared by functions, and then development into the bit map data 8400 by reference of a text drawing function 8230 to font data 8220.

The module 8300, for bit map development of a graphic object, effects suitable transfer of the graphic object Gph-7300 to a graphic object buffer 7310 and a color information designation field 7311 which are temporary areas prepared by functions, and then development into the bit map data 8400 by a graphic object drawing function 7330.

The modules for "preview display" are divided into 8500, 8600 and 8700 according to the kind of data (image, text, graphics). In each module, the bit map development is conducted at a high speed through a color table (8540, 8640, 8740).

The module 8500, for bit map development of an image object, generates bit map data 8800 through a bit map development function 8530, by suitably transferring the image data to a file buffer 8520 while referring to a file stream 8510 designated by the image file name Img-7100.

In this operation, a color conversion for the "preview display" is executed through a color table A-8540.

The module 8600, for bit map development of a text object, effects suitable transfer of the strings object Txt-7200 to a strings buffer 8610 and a color information designation field 8611, which are temporary areas prepared by functions and then development into the bit map data 8800 by reference of a text drawing function 8630 to font data 8620.

In this operation, a color conversion for the "preview display" is executed through a color table B-8640.

The module 8700, for bit map development of a graphic object, effects suitable transfer of the graphic object Gph-7300 to a graphic object buffer 8310 and a color information designation field which are temporary areas prepared by functions, and then development into the bit map data 8400 by a graphic object drawing function 8330. In this operation a color conversion for the "preview display" is executed by a color table C-8740.

[2.3 Outlined process of the entire system]

The discrimination for the "normal display" or the "preview display" is conducted at the event branching process. FIG. 13 is a schematic flow chart showing the process of the entire system of the present embodiment.

The system of the present embodiment is basically the event-driven type, in which the process remains in a waiting state until an event occurs, and, branches to a suitable process in response to the event.

When the system is activated, a step S10 effects system initialization (area securing for variables etc. and initialization of variables and structures).

Then a step S20 sets a default color table. This is to set the color tables in FIG. 12 (8540, 8640, 8740) by the default color tables prepared in advance in the system, for the print preview color conversion.

Then the sequence proceeds to a step S31 to enter a state waiting for an event. In the waiting state in the step S31, the sequence does not proceed unless an event occurs, but proceeds to a next step when the event occurs. A next step S32 discriminates whether said event is a system ending event, and, if so, the sequence immediately proceeds to a system ending step S50 to terminate the sequence. In case of another event, the sequence proceeds to an event branching step S40 to effect a process matching the occurring event.

The event considered in this sequence is, for example, "re-drawing of image frame" or the like.

In the present embodiment, in data display, the "normal display" and "preview display" are taken as independent events which are suitably processed by an event branching step S30. In FIG. 12, a discrimination "preview display?" is dealt with by said step.

[2.4 Color conversion]

Figure 14:
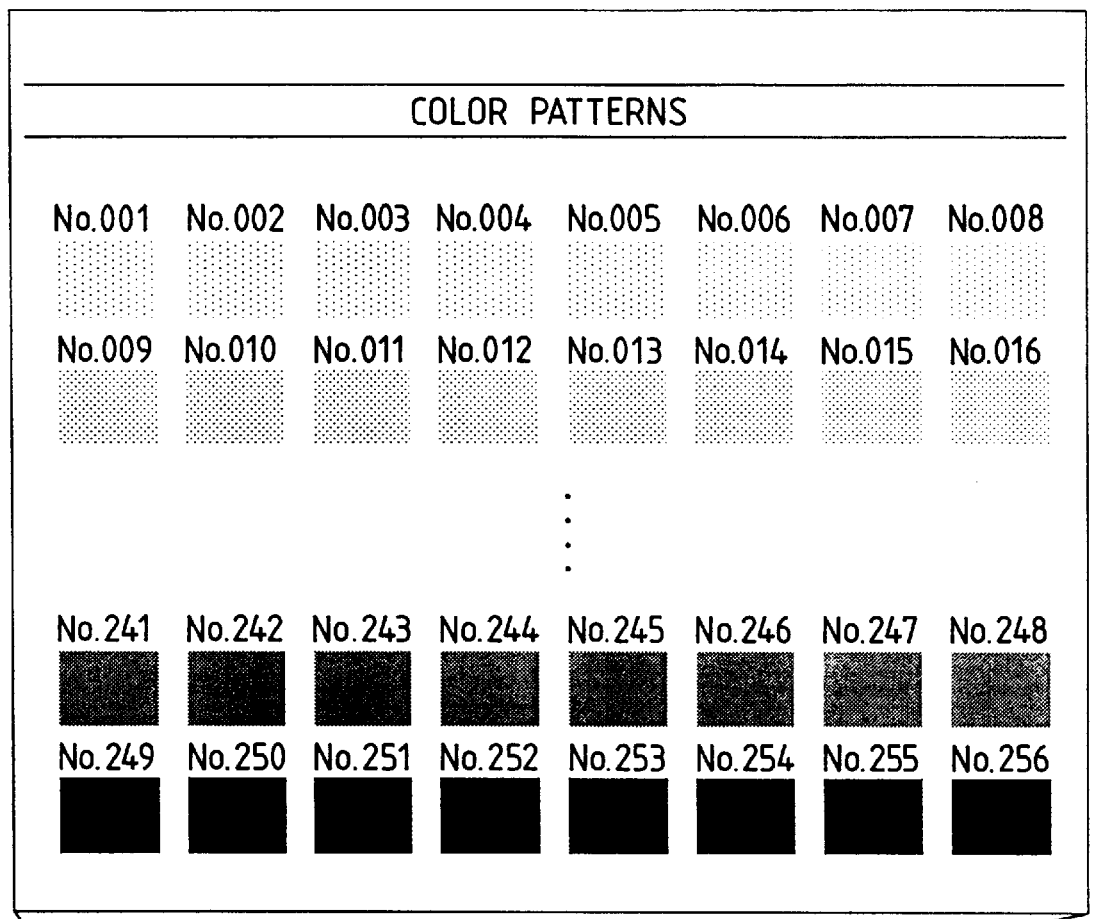
FIG. 14 is a view showing an example of color numbers in a color printer to be used in the second embodiment, and actual color samples and monitor colors corresponding thereto.

FIG. 14 is a view showing the correspondence between the print colors corresponding to color numbers, and the monitor colors corresponding to the print colors.

In the present embodiment, default color tables are set at the activation of the system.

As the color printer device to be used effects an image processing for exactly reproducing the color indicated by the designated color number, there are prepared such default color tables as to minimize the color difference between the print color and the monitor color in the L*a*b* space.

Separately, the present embodiment provides a function which enables the user to arbitrarily change the color tables.

[2.5 Color table re-writing tool]

Figure 15:
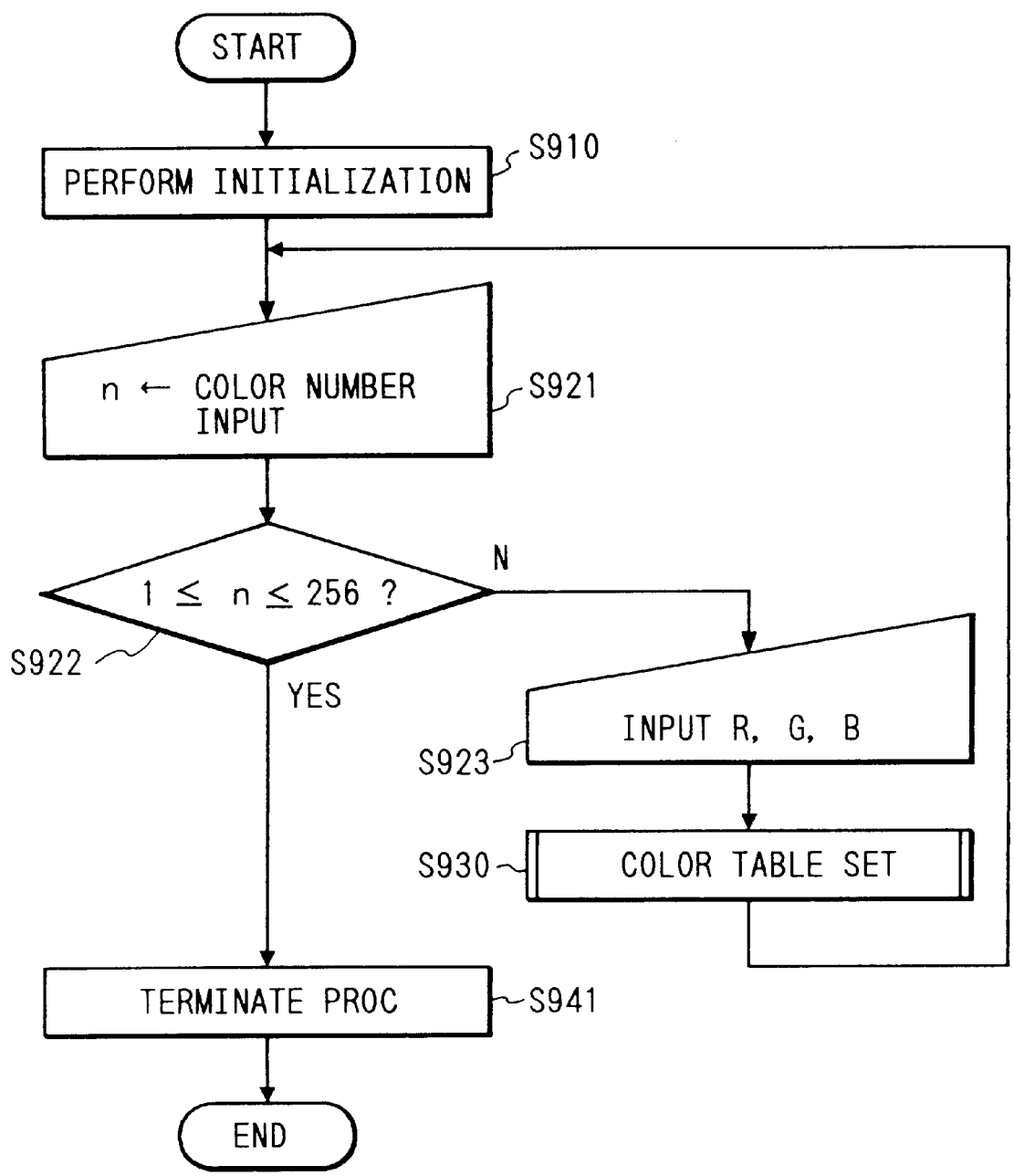
FIG. 15 is a schematic flow chart showing a process for rewriting a color table corresponding to the color numbers of a color printer to be used in the second embodiment.

FIG. 15 is a schematic flow chart showing a color table re-writing process.

The user can achieve arbitrary preview, by color conversion with a color table obtained by said color table re-writing tool.

At first a step S910 effects initialization (area securing for variables etc., and initialization of variables, structure etc.).

Then a step S921 enters a color number n to be varied.

If the entered color number n is between 1 and 256 (step S922), the sequence proceeds to a step S923, but, if otherwise, the sequence proceeds to a step S941 to immediately terminate the sequence.

The step S923 enters the R, G, B values of the color to be varied. This operation means the entry of a monitor color (preview color) corresponding to the print color n. The R, G, B values thus entered can be arbitrarily selected. For example, in case a print color n=No. 250 is yellow, the preview color n=No. 250' is a color close to the yellow print color in the default state, but it can be a completely different color, for example red.

A step S930 writes the entered R, G, B values in the color table, and the sequence returns to the step S921.

Thus, utilizing the particular effect achievable by the image processing in the printer device to be used in this invention, namely the effect of exactly reproducing the color indicated by the color number in case of the present embodiment, the user can observe, on the display device, an image reproducible by the preview function on the display device and closer to the reproduction on the printer device.

Also the process can be executed at a high speed, by providing the process unit for preview display and the process unit for normal display in separate manner.

[Other embodiments]

Figure 16:
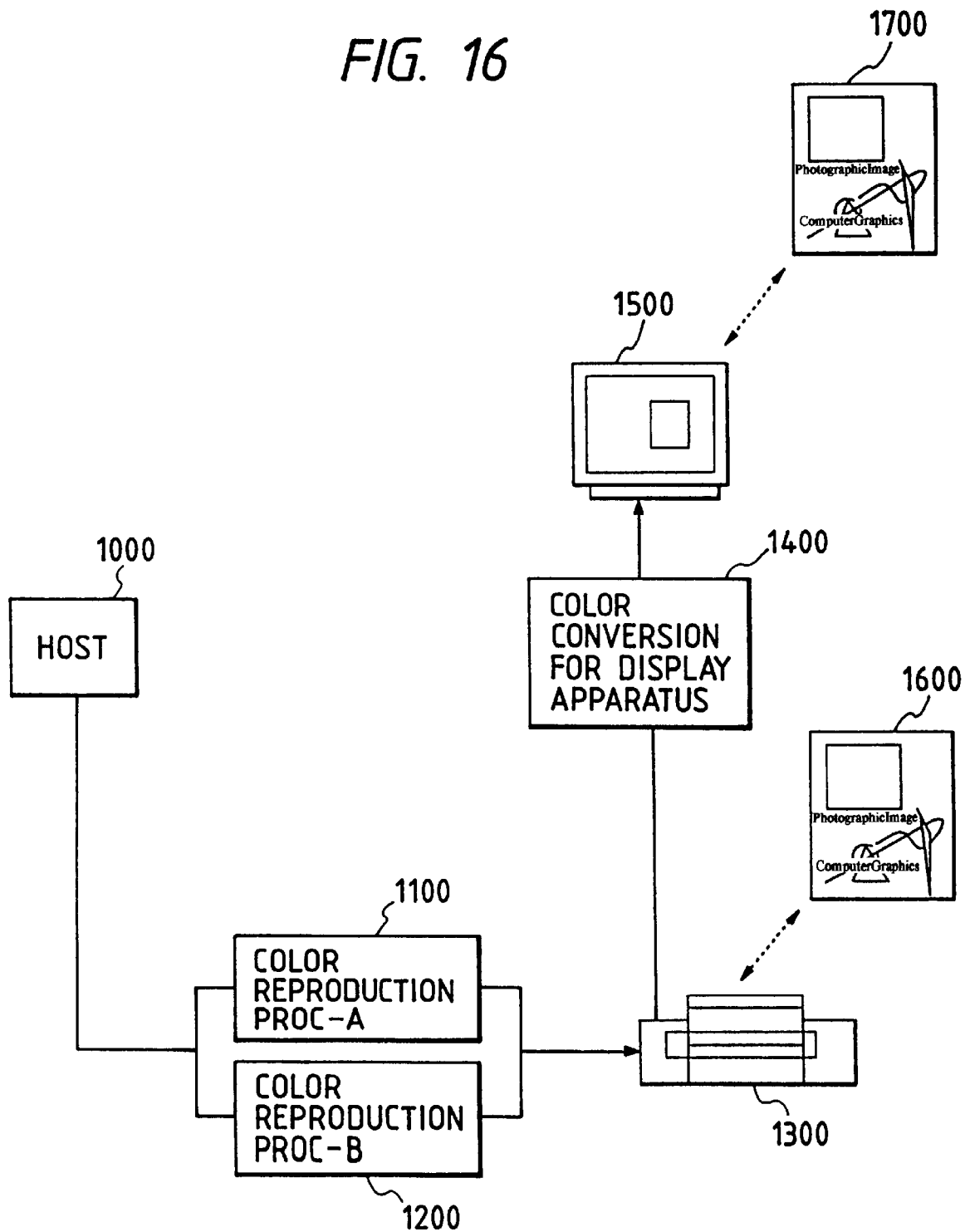
FIG. 16 is a block diagram of another embodiment.

Other embodiments of the present invention will be explained in the following with reference to FIG. 16. A host equipment 1000 effects a color reproduction process A1100 or B1200 for conversion into the data desired by the user, in consideration of the characteristics of a printer device 1300, such as the aforementioned process "for more preferred color reproduction" for the image data or the process "for color reproduction for minimizing the color difference" of the CG image. The image output device 1300 receives the color-converted image data, and releases an image 1400 and also effects a color conversion 1900 for the display device on the received image data in consideration of the characteristics of the monitor device, for supply to a monitor 1500. The display device 1500 releases a preview image 1700 based on the received image data.

Consequently the user can always confirm the output image of the image output device 1300, by the preview image 1700 on the display device 1500.

Also in case the image data received by the image output device 1300 are subjected to image processing, such as color conversion, independently owned by said image output device 1300, the result can be confirmed in simple manner on the display device 1500. Consequently the user can designate the process in the image output device 1300, while confirming the result by the preview image 1700.

The input image data are not limited to those in the RGB color space, but can be the data in other color spaces, such as those in the YIQ space.

Also the color conversion function for preview is not limited to the method explained in the foregoing, but can also be achieved by other methods, such as color correction by masking or gamma correction, or a LUT for color space compression.

Also the "color reproduction minimizing the color difference" is applicable not only to the CG images, but also for example to an image of which color is designated by a color number, based on a print sample.

Stated differently, said color reproduction is applicable to image data represented by code data, such as text data, graphic data or color number data.

Also the color reproduction process may include a color space compression process for mapping the color reproduction range of the input image data into the color reproduction range of the image output device.

In the color reproduction process includes the color space compression process, the preview color conversion corresponds to the color reproduction process including said color space compression process.

As explained in the foregoing, the present invention allows to obtain a more exact preview image, in comparison with the output image to be obtained in the output device to be used.

Also there can be obtained a more exact preview image also for an output device capable of color reproduction according to the image data.

The present invention is not limited to the foregoing embodiments but is subject to various modifications within the scope and spirit of the appended claims.

What is claimed is:

1. An image processing method which generates color image data for previewing an image to be formed by a color image forming apparatus, the method comprising the steps of:

discriminating an object type of data for the image from among an image object, a text object, and a graphics object;

selecting a color conversion process for converting the data based on the discriminated object type, a different color conversion process being selected for each object type; and generating color image data for previewing the image by performing the selected color conversion process on the data for the image.

2. An image processing method according to claim 1, wherein said color conversion process corresponds to a color reproduction process performed by the color image forming apparatus.

3. An image processing method according to claim 2, wherein said color conversion process is performed in accordance with characteristics of a device used to preview the image.

4. An image processing method according to claim 2, wherein said color reproduction process is performed in accordance with image characteristics of the image data for the image and characteristics of said color image forming apparatus.

5. An image processing method according to claim 1, wherein said color conversion process is arbitrarily settable by a user.

6. An image processing method according to claim 1, wherein the object type of the image data for the image is one of a pictorial image, text and graphics.

7. An image processing apparatus which generates color image data for previewing an image to be formed by a color image forming apparatus, said apparatus comprising:

discriminating means for discriminating an object type of data for the image from among an image object, a text object, and a graphics object;

selecting a color conversion process for converting the data based on the discriminated object type, a different color conversion process being selected for each object type; and generating means for generating color image data for previewing the image by performing the selected color conversion process on the data for the image.

8. An image processing method comprising the steps of:

setting either a normal display mode or a preview display mode;

wherein, in a case that the preview display mode is set in said setting step, the method comprises:

discriminating an object type of data for the image from among an image object, a text object, and a graphics object;

selecting a color conversion process for converting the data based on the discriminated object type, a different color conversion process being selected for each object type; and generating color image data for previewing the image by performing the selected color conversion process on the data for the image, the color image data generated in the generating step representing a preview image corresponding to a color image to be formed by a color image forming apparatus.

9. A method according to claim 6, wherein, in a case that the image is a pictorial image, the color conversion process is performed on the image data for the image in order to obtain a desired reproduction of the image; and wherein, in a case that the image is graphics, the color conversion process is performed in order to minimize a color difference.

10. A method according to claim 1, wherein the discriminating step includes an analyzing step to analyze a data format of the image data for the image.

11. A method according to claim 7, wherein the discriminating means includes an analyzing means to analyze a data format of the image data for the image.

12. A method according to claim 8, wherein the discriminating step includes an analyzing step to analyze a data format of the image data for the image.

* * * * *

UNITED STATES PATENT AND TRADEMARK OFFICE
CERTIFICATE OF CORRECTION

PATENT NO. : 5,946,412

DATED : August 31, 1999

INVENTOR : NAOYUKI NISHIKAWA

It is certified that error appears in the above-identified patent and that said Letters Patent is hereby corrected as shown below:

<u>COLUMN 11</u>

Line 59, "1400" should read --1600--.

Line 60, "1900" should read --1400--.

<u>COLUMN 12</u>

Line 4, "result-can" should read --result can--.

Signed and Sealed this

Twenty-third Day of May, 2000

Attest:

Q. TODD DICKINSON

*Attesting Officer*          *Director of Patents and Trademarks*